United States Patent
Didehvar

(10) Patent No.: US 8,851,305 B2
(45) Date of Patent: Oct. 7, 2014

(54) UNIDIRECTIONAL TENSION ROD MECHANISM

(75) Inventor: Kaveh Didehvar, Hockessin, DE (US)

(73) Assignee: Zenith Products Corporation, New Castle, DE (US)

( * ) Notice: Subject to any disclaimer, the term of this patent is extended or adjusted under 35 U.S.C. 154(b) by 278 days.

(21) Appl. No.: 13/269,030

(22) Filed: Oct. 7, 2011

(65) Prior Publication Data

US 2012/0152873 A1 Jun. 21, 2012

Related U.S. Application Data

(60) Provisional application No. 61/424,461, filed on Dec. 17, 2010.

(51) Int. Cl.
*A47H 1/022* (2006.01)
*E04G 25/04* (2006.01)
*F16B 7/16* (2006.01)
*F16B 7/18* (2006.01)

(52) U.S. Cl.
CPC ............... *A47H 1/022* (2013.01); *E04G 25/04* (2013.01); *F16B 7/182* (2013.01); *F16B 2007/16* (2013.01)
USPC .................... 211/105.4; 211/123; 248/354.3; 403/109.4; 403/377

(58) Field of Classification Search
CPC .......... A47H 1/02; A47H 1/022; E04G 25/04; E04G 2025/04; F16B 7/10; F16B 7/105; F16B 7/14; F16B 7/16; F16B 7/18; F16B 2007/10; F16B 2007/14; F16B 2007/16; F16B 7/182

USPC ........................ 211/105.1, 105.3, 105.4, 123; 248/354.1, 354.3; 403/109.1, 109.4, 403/377

See application file for complete search history.

(56) References Cited

U.S. PATENT DOCUMENTS

D19,582 S    1/1890   Lau
653,642 A    7/1900   Darling
(Continued)

FOREIGN PATENT DOCUMENTS

CH     625601 A5   9/1981
CN    2221357 Y    3/1996
(Continued)

OTHER PUBLICATIONS

Office Action issued Jun. 21, 2013 in U.S. Appl. No. 13/752,724 by Lindo.

(Continued)

*Primary Examiner* — Michael Safavi
(74) *Attorney, Agent, or Firm* — Panitch Schwarze Belisario & Nadel LLP

(57) ABSTRACT

A tension rod mechanism for a tension rod having a first outer shaft with a second inner shaft slideable therein has a unidirectional slip-lock configured to be received in the first outer shaft for rotational movement therewith and unidirectional slidable axial movement relative thereto. A threaded shaft is fixedly connected to the unidirectional slip-lock. A collar is threadingly engaged with the threaded shaft and configured to be fixedly received in the second inner shaft for movement therewith. When the unidirectional slip-lock is in the first outer shaft and the collar is fixedly received in the second inner shaft, slidable axial movement of the unidirectional slip-lock relative to the first outer shaft may occur only in an expansion direction A rotation of the first outer shaft relative to the second inner shaft increases the axial distance between the unidirectional slip-lock and the collar.

8 Claims, 3 Drawing Sheets

(56) References Cited

U.S. PATENT DOCUMENTS

| | | | |
|---|---|---|---|
| 839,959 A | 1/1907 | Richards | |
| 1,481,730 A | 1/1924 | Oakley | |
| 1,502,154 A | 7/1924 | Meuller | |
| 1,675,111 A | 6/1928 | Kenney | |
| 1,679,881 A | 8/1928 | Simpson | |
| 1,721,305 A | 7/1929 | Koering | |
| 1,721,306 A | 7/1929 | Koering | |
| D81,134 S | 5/1930 | Henderson | |
| 1,837,340 A | 12/1931 | Schwartz | |
| 1,951,660 A * | 3/1934 | Klaudt | 211/123 |
| 1,953,450 A | 4/1934 | Thompson | |
| 2,131,156 A | 9/1938 | Yardley | |
| 2,150,204 A | 3/1939 | Boye | |
| D119,576 S | 3/1940 | Kirsch | |
| 2,194,064 A | 3/1940 | Boye | |
| 2,195,979 A | 4/1940 | Ziolkowski | |
| 2,215,331 A | 9/1940 | Marsh | |
| 2,219,075 A | 10/1940 | Veau | |
| 2,250,003 A | 7/1941 | Boye | |
| 2,293,168 A * | 8/1942 | Pirone | 211/123 |
| 2,383,104 A | 8/1945 | Allen | |
| 2,458,643 A | 1/1949 | Riley | |
| 2,462,321 A * | 2/1949 | Holmes | 211/123 |
| 2,519,996 A | 8/1950 | Blake | |
| 2,562,371 A * | 7/1951 | Shannon | 16/87.2 |
| 2,637,555 A | 5/1953 | Klaudt | |
| 2,778,030 A | 1/1957 | Goche | |
| 2,796,227 A | 6/1957 | Coakley | |
| 2,915,327 A | 12/1959 | Kreske | |
| 2,919,134 A | 12/1959 | Zuro | |
| 2,974,806 A | 3/1961 | Seewack | |
| 3,023,909 A | 3/1962 | Henry | |
| 3,079,005 A | 2/1963 | Bednar | |
| 3,107,361 A | 10/1963 | Glutting, Sr. | |
| 3,418,665 A | 12/1968 | Long | |
| 3,429,452 A | 2/1969 | Johnson | |
| 3,493,121 A | 2/1970 | Doyle | |
| 3,504,805 A | 4/1970 | Doyle | |
| 3,521,758 A | 7/1970 | Guilfoyle, Sr. | |
| 3,557,390 A | 1/1971 | Ruggles et al. | |
| 3,572,511 A | 3/1971 | Triplett | |
| 3,687,499 A | 8/1972 | Guilfoyle, Sr. | |
| 3,864,760 A | 2/1975 | Bowen | |
| D248,434 S | 7/1978 | Clivio et al. | |
| 4,117,557 A | 10/1978 | McPeak et al. | |
| 4,229,842 A | 10/1980 | Gilmore | |
| 4,238,164 A | 12/1980 | Mazzolla | |
| 4,329,076 A | 5/1982 | Coreth | |
| 4,378,071 A * | 3/1983 | Yakimicki | 211/105.4 |
| 4,399,917 A | 8/1983 | Ohman | |
| 4,461,056 A | 7/1984 | Solinski | |
| 4,496,059 A | 1/1985 | Leiter | |
| 4,586,615 A | 5/1986 | Quitmann | |
| 4,636,106 A | 1/1987 | Waisbrod | |
| D293,297 S | 12/1987 | Wood | |
| 4,754,504 A | 7/1988 | Cellini | |
| 4,809,401 A | 3/1989 | Honig | |
| D301,976 S | 7/1989 | Greenhut et al. | |
| 4,895,471 A * | 1/1990 | Geltz et al. | 403/104 |
| 5,022,104 A | 6/1991 | Miller | |
| 5,056,753 A | 10/1991 | Lunau et al. | |
| 5,103,531 A | 4/1992 | Perrotta | |
| D327,421 S | 6/1992 | Pagan | |
| 5,189,759 A | 3/1993 | Poore | |
| 5,216,766 A | 6/1993 | Lang | |
| 5,236,229 A | 8/1993 | Gonzalez | |
| 5,242,065 A | 9/1993 | Hoban | |
| 5,263,594 A | 11/1993 | Bianchi | |
| 5,281,063 A | 1/1994 | Austin, III | |
| D347,784 S | 6/1994 | Warshawsky | |
| 5,330,061 A | 7/1994 | Geltz | |
| 5,433,551 A | 7/1995 | Gordon | |
| 5,477,964 A | 12/1995 | Hart | |
| 5,484,056 A | 1/1996 | Wood | |
| D374,167 S | 10/1996 | Scholl | |
| 5,561,870 A | 10/1996 | Hertel | |
| D376,312 S | 12/1996 | Cahn et al. | |
| D377,753 S | 2/1997 | Meadows | |
| D379,297 S | 5/1997 | Shires | |
| 5,662,297 A | 9/1997 | Christensen et al. | |
| D385,177 S | 10/1997 | Perry | |
| 5,678,703 A | 10/1997 | Sawyer | |
| D393,390 S | 4/1998 | Gottwald | |
| D397,928 S | 9/1998 | Wise | |
| 5,803,643 A | 9/1998 | Patelli et al. | |
| 5,876,147 A | 3/1999 | Longo | |
| 5,894,610 A | 4/1999 | Winter | |
| D416,785 S | 11/1999 | Ming-Hsiao | |
| D426,142 S | 6/2000 | Moore | |
| D429,461 S | 8/2000 | Rowlay | |
| 6,101,675 A | 8/2000 | Goldstein | |
| D431,460 S | 10/2000 | Nichol | |
| D438,462 S | 3/2001 | Nichol | |
| 6,216,287 B1 | 4/2001 | Wise | |
| 6,263,523 B1 | 7/2001 | Moore | |
| 6,302,180 B1 | 10/2001 | Yu | |
| 6,302,614 B1 | 10/2001 | Tseng | |
| D466,399 S | 12/2002 | Jessee et al. | |
| 6,543,629 B1 | 4/2003 | Samelson | |
| 6,640,395 B2 | 11/2003 | Bush | |
| 6,651,831 B2 | 11/2003 | Samelson | |
| D483,251 S | 12/2003 | Suero, Jr. | |
| 6,694,543 B2 | 2/2004 | Moore | |
| 6,715,163 B1 | 4/2004 | Cunningham | |
| D489,249 S | 5/2004 | Moore | |
| 6,745,909 B1 | 6/2004 | Lai | |
| D498,663 S | 11/2004 | Moore | |
| 6,824,000 B2 | 11/2004 | Samelson | |
| 6,845,955 B1 | 1/2005 | Hsu | |
| 6,862,776 B2 | 3/2005 | Chen | |
| 6,883,664 B2 | 4/2005 | Lee | |
| D506,920 S | 7/2005 | Taylor | |
| 6,913,156 B1 | 7/2005 | Wolff | |
| 7,024,706 B2 | 4/2006 | Hess | |
| D522,845 S | 6/2006 | Suero | |
| D522,846 S | 6/2006 | Suero, Jr. | |
| D522,847 S | 6/2006 | Suero, Jr. | |
| 7,055,680 B2 | 6/2006 | Liebers | |
| D525,115 S | 7/2006 | Harwanko | |
| 7,076,815 B2 | 7/2006 | Orpilla | |
| 7,111,336 B1 | 9/2006 | Lai | |
| D534,062 S | 12/2006 | van den Bosch | |
| D542,125 S | 5/2007 | Kaminski | |
| D542,897 S | 5/2007 | Harwanko | |
| D543,754 S | 6/2007 | Bauer et al. | |
| D543,756 S | 6/2007 | Gilbert | |
| D543,839 S | 6/2007 | Cooper et al. | |
| D544,786 S | 6/2007 | Barrese | |
| D547,165 S | 7/2007 | Barrese | |
| D550,542 S | 9/2007 | Worrall et al. | |
| D552,455 S | 10/2007 | Moore | |
| 7,296,772 B2 | 11/2007 | Wang | |
| D557,590 S | 12/2007 | Moore | |
| D563,209 S | 3/2008 | Samelson | |
| D563,526 S | 3/2008 | Bauer | |
| D565,937 S | 4/2008 | Tsai | |
| D567,637 S | 4/2008 | Moore | |
| D576,022 S | 9/2008 | Goldstein | |
| D577,991 S | 10/2008 | Chen | |
| D586,647 S | 2/2009 | Didehvar | |
| 7,512,997 B2 | 4/2009 | Dewees | |
| 7,597,297 B2 | 10/2009 | Isfeld et al. | |
| D618,542 S | 6/2010 | Bertken | |
| 7,762,508 B2 | 7/2010 | Xu | |
| D624,807 S | 10/2010 | Barrese | |
| D624,808 S | 10/2010 | Krawczak et al. | |
| 7,857,151 B2 | 12/2010 | Barrese | |
| D631,273 S | 1/2011 | O'Brien et al. | |
| D631,732 S | 2/2011 | Krawczak et al. | |
| D633,780 S | 3/2011 | Barrese | |
| D634,609 S | 3/2011 | Bauer | |
| D636,660 S | 4/2011 | O'Connell | |
| 7,926,127 B2 | 4/2011 | Barrese | |
| 7,950,534 B2 | 5/2011 | Kao | |

(56) References Cited

U.S. PATENT DOCUMENTS

| | | | |
|---|---|---|---|
| D640,078 S | 6/2011 | Gilbert | |
| 7,958,577 B2 | 6/2011 | Chang | |
| 7,987,532 B2 | 8/2011 | Bathurst et al. | |
| 7,987,534 B2 | 8/2011 | Lin | |
| 7,997,428 B2 | 8/2011 | Goldstein | |
| 8,015,633 B2 | 9/2011 | Ho | |
| D648,619 S | 11/2011 | Lowe | |
| D648,834 S | 11/2011 | Gilbert | |
| 8,056,873 B1 | 11/2011 | Hanley et al. | |
| D650,263 S | 12/2011 | Barrese | |
| 8,069,507 B2 | 12/2011 | Didehvar et al. | |
| 8,069,508 B2 | 12/2011 | O'Connell | |
| 8,146,182 B2 | 4/2012 | Bauer | |
| 8,185,981 B2 | 5/2012 | Didehvar et al. | |
| 8,214,938 B2 | 7/2012 | Hanley et al. | |
| 8,215,501 B2 * | 7/2012 | Trettin et al. | 211/105.2 |
| 8,215,863 B2 | 7/2012 | Sohn | |
| D667,295 S | 9/2012 | Harwanko | |
| 8,297,870 B2 | 10/2012 | Lenhart | |
| D671,395 S | 11/2012 | Harwanko | |
| 8,341,775 B2 | 1/2013 | Didehvar | |
| 8,505,129 B2 | 8/2013 | Parker et al. | |
| 8,505,749 B2 | 8/2013 | Trettin et al. | |
| 8,522,373 B2 | 9/2013 | Bauer | |
| D691,030 S | 10/2013 | Lindo et al. | |
| 2003/0034316 A1 | 2/2003 | Kao | |
| 2003/0052070 A1 | 3/2003 | Weisenburger | |
| 2004/0178310 A1 | 9/2004 | Marion | |
| 2004/0182806 A1* | 9/2004 | Figueroa | 211/105.4 |
| 2005/0053423 A1 | 3/2005 | Doubler et al. | |
| 2005/0230587 A1 | 10/2005 | Yang | |
| 2005/0268394 A1 | 12/2005 | Monk et al. | |
| 2006/0070177 A1 | 4/2006 | Bathurst et al. | |
| 2006/0156465 A1 | 7/2006 | Lavi et al. | |
| 2006/0218717 A1 | 10/2006 | van den Bosch | |
| 2007/0006377 A1 | 1/2007 | Moore | |
| 2007/0006378 A1 | 1/2007 | Moore | |
| 2007/0174956 A1 | 8/2007 | Heaslip | |
| 2008/0022451 A1 | 1/2008 | Urlich et al. | |
| 2008/0028513 A1 | 2/2008 | Didehvar | |
| 2008/0115265 A1 | 5/2008 | Heaslip | |
| 2008/0184479 A1 | 8/2008 | Bathurst | |
| 2008/0210827 A1 | 9/2008 | Samelson | |
| 2008/0245486 A1 | 10/2008 | Brown | |
| 2008/0245940 A1 | 10/2008 | Brown | |
| 2008/0282464 A1 | 11/2008 | Bauer | |
| 2008/0289096 A1 | 11/2008 | Patel | |
| 2009/0083905 A1 | 4/2009 | O'Connell | |
| 2011/0011813 A1 | 1/2011 | Kao | |
| 2011/0113547 A1 | 5/2011 | O'Connell | |
| 2012/0005823 A1 | 1/2012 | Baines | |
| 2012/0023657 A1 | 2/2012 | Didehvar et al. | |
| 2012/0036628 A1 | 2/2012 | O'Connell | |
| 2012/0110729 A1 | 5/2012 | Baines | |
| 2012/0152872 A1 | 6/2012 | Didehvar | |
| 2012/0152874 A1 | 6/2012 | Didehvar | |
| 2012/0167368 A1 | 7/2012 | Napier et al. | |
| 2012/0241399 A1 | 9/2012 | Trettin et al. | |
| 2012/0284914 A1 | 11/2012 | Bauer | |
| 2012/0285914 A1 | 11/2012 | Carney | |

FOREIGN PATENT DOCUMENTS

| | | |
|---|---|---|
| CN | 2228573 Y | 6/1996 |
| CN | 2349932 Y | 11/1999 |
| CN | 2566754 Y | 8/2003 |
| CN | 2835679 Y | 11/2006 |
| CN | 2893271 Y | 4/2007 |
| CN | 2902096 Y | 5/2007 |
| CN | 201001603 Y | 1/2008 |
| CN | 201189069 Y | 2/2009 |
| CN | 201363343 Y | 12/2009 |
| GB | 2325397 A | 11/1998 |
| GB | 2400813 A | 10/2004 |
| GB | 2426693 A | 12/2006 |
| JP | 2000-046021 A | 2/2000 |
| JP | 2001-112561 A | 4/2001 |
| JP | 2004-036803 A | 2/2004 |
| JP | 2004-057213 A | 2/2004 |

OTHER PUBLICATIONS

Office Action issued Jul. 8, 2013 in U.S. Appl. No. 13/269,108 by Didehvar.
Office Action issued Apr. 2, 2013 in U.S. Appl. No. 29/437,013.
U.S. Appl. No. 29/451,499 by Harwanko, filed Apr. 3, 2013.
U.S. Appl. No. 13/911,191 by Didehvar, filed Jun. 6, 2013.
<http://plumbing.hardwarestore.com/51-283-shower-rods-and-holders/stanless-steel-curved-shower-rod-609421.aspx>; "Stanless Steel Curved Shower Rod, 1"x5'"; web page printout date: Feb. 10, 2010; original web posting date: unknown, 1 page. (admitted prior art).
Office Action issued Jul. 8, 2011 in U.S. Appl. No. 11/833,044.
U.S. Appl. No. 13/253,617, filed Oct. 5, 2011.
Office Action issued Dec. 11, 2012 in U.S. Appl. No. 29/381,234.
Notice of Allowance issued Jul. 24, 2012 in U.S. Appl. No. 29/422,283.
U.S. Appl. No. 29/398,880 by Lindo, filed Aug. 5, 2011.
Office Action issued Feb. 16, 2012 in U.S. Appl. No. 13/253,617.
U.S. Appl. No. 29/381,234 by Didehvar, filed Dec. 16, 2010.
U.S. Appl. No. 29/390,736 by Harwanko, filed Apr. 28, 2011.
U.S. Appl. No. 13/676,800 by Didehvar, filed Nov. 14, 2012.
U.S. Appl. No. 13/676,802 by Didehvar, filed Nov. 14, 2012.
Office Action issued Jul. 20, 2011 in U.S. Appl. No. 12/157,376.
Office Action issued Nov. 22, 2011 in U.S. Appl. No. 12/157,376.
U.S. Appl. No. 29/437,013 by Didehvar, filed Nov. 12, 2012.
U.S. Appl. No. 29/443,578 by Lindo, filed Jan. 18, 2013.
<http://www.amazon.com/Polder-Radial-Duo-Shower-Rod/dp/B001CEONRY>; Polder Radial Duo Shower Rod, web page printout date: Jun. 2, 2011; original web posting date and product availability date: unknown, 3 pages. (admitted prior art).
U.S. Appl. No. 29/398,881 by Walker, filed Aug. 5, 2011.
Photograph of Curved Shower Rod by Hardware Resources (admitted prior art).
Photograph of a curved shower rod distributed by Popular Bath Products, Inc. (admitted prior art).
Photographs of Tension Rod With End Cap and Cover (1)—Date Unknown—Admitted Prior Art.
Photographs of Tension Rod With End Cap and Cover (2)—Date Unknown—Admitted Prior Art.
Office Action issued Dec. 14, 2012 in U.S. Appl. No. 13/269,108.
U.S. Appl. No. 13/752,724 by Lindo, filed Jan. 29, 2013.
Three photographs of Maytex Mills "EZ-Up" tension rod (date unknown) (admitted prior art).
"Masterform Tool Company; Clevis Brackets", web page printout date: Feb. 11, 2010; original web posting date and product availability date: unknown, 1 page. (admitted prior art), retrieved from: http://www.masterformtool.com/catalog.asp?category=2&class=11&subclass=0&part=0.
"Medium—to Heavy-Duty Repairable Cylinders", Aro—20546 Clevis Bracket, SKU—40769, web page printout date: Feb. 11, 2010; original web posting date: unknown, 1 page. (admitted prior art), retrieved from: http://www.drillspot.com/products/40400/ingersoll-rand_20547_clevis_bracket.
"Clevis Bracket, Material: Forging, Weldment, or Ductile Iron", web page printout date: Feb. 11, 2010; original web posting date: unknown, 1 page. (admitted prior art), retrieved from: http://www.aggressivehydraulics.com/products/cylinder-component-parts/mounts/.
JCPenney, "Curved Smart Shower Rod" (admitted prior art), retrieved from http://www.jcpenney.com/curved-smart-shower-curtain-rod/prod.jump?ppId=pp5002324584&cmvc=JCP|dept2000 0012|cat100250092|RICHREL&grView=&eventRootCatId=&currentTabCatId=&regId=.

(56) References Cited

OTHER PUBLICATIONS

Office Action issued Oct. 4, 2013 in U.S. Appl. No. 13/268,712 by Didehvar.

Office Action issued Nov. 29, 2013 in U.S. Appl. No. 13/268,712 by Didehvar.

Office Action issued Dec. 6, 2013 in U.S. Appl. No. 13/269,108 by Didehvar.

Office Action issued Dec. 27, 2013 in U.S. Appl. No. 13/752,724 by Lindo.

Office Action issued Jul. 2, 2014 in U.S. Appl. No. 13/269,108 by Didehvar.

* cited by examiner

UNIDIRECTIONAL TENSION ROD MECHANISM

CROSS-REFERENCE TO RELATED APPLICATIONS

This application is related to U.S. Provisional Patent Application No. 61/424,461, filed Dec. 17, 2010, and claims the earlier filing dates of the provisional applications. The above-identified related application is incorporated herein by reference.

BACKGROUND OF THE INVENTION

An embodiment of the present invention relates generally to an adjustable tension rod mechanism, and more particularly, to an adjustable tension rod mechanism with dual direction capabilities for locking the tension rod mechanism in place.

Adjustable length tension rods for use as curtain or shower rods are generally used as an alternative to rods that are permanently fixed to support surfaces through the use of screws, bolts, or the like. This provides for simpler installation and prevents permanent damage to the support surfaces upon removal. These tension rods typically include a first shaft that telescopingly receives a second shaft, wherein the first and second shafts house a long threaded stud. The tension rod is often shipped and purchased in a contracted state, such that a user must expand the tension rod for installation at the desired location. Once the desired length is reached, i.e., the end faces of the tension rod contact the walls or other support surfaces, the first and second shafts are rotated with respect to each other until a sufficient force is applied against the support surfaces to maintain the tension rod in compression and in place.

In tension rods having the long threaded stud, expansion is accomplished by rotating the first and second shafts with respect to one another until the desired length is reached. A user often must expand the tension rod by twenty or more inches, and the constant rotation required can be time-consuming and exhausting.

More recently, tension rods have been introduced that allow the user to easily expand the tension rod by pulling the first and second shafts in opposing directions. However, the tension rod must be pulled to a length that is larger than the distance between the support surfaces. Tension is then applied by compressing a spring within the tension rod until the desired length is achieved. Once in place, the force of the compressed spring provides the tension for holding the tension rod in place between the support surfaces. The spring can be difficult to compress, and positioning of the tension rod may scuff or damage the support surfaces as the rod is put into place. Further, if not properly locked into place, the spring may release and cause injury to the user. Because the strength of the spring must be selected to balance between user friendliness and allow the rod to support sufficient weight, which can be up to twenty pounds, weight support is often sacrificed.

It is therefore desirable to provide an adjustable tension rod mechanism that is easy to expand to the desired length, but does not require spring compression or the use of other hazardous mechanisms for providing the necessary tension between the support surfaces.

BRIEF SUMMARY OF THE INVENTION

Briefly stated, one embodiment of the present invention is directed to a tension rod mechanism for a tension rod having a first outer shaft and a second inner shaft slideably received by the first outer shaft and rotatable about a longitudinal axis of the tension rod. The tension rod mechanism comprises a unidirectional slip-lock configured to be received in the first outer shaft for rotational movement therewith and unidirectional slidable axial movement relative thereto. A threaded shaft is fixedly connected to the unidirectional slip-lock. A collar is threadingly engaged with the threaded shaft and configured to be fixedly received in the second inner shaft for movement therewith. When the unidirectional slip-lock is in the first outer shaft and the collar is fixedly received in the second inner shaft, slidable axial movement of the unidirectional slip-lock relative to the first outer shaft may occur only in an expansion direction and a rotation of the first outer shaft relative to the second inner shaft increases the axial distance between the unidirectional slip-lock and the collar.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
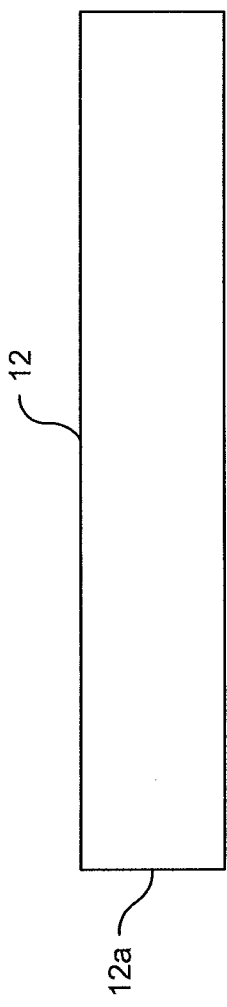
FIG. 1A is a side elevational view of a first outer shaft of a tension rod in accordance with a preferred embodiment of the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the structure to which reference is made, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first shaft could be termed a second shaft, and, similarly, a second shaft could be termed a first shaft, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a tension rod mechanism in accordance with the present invention.

Referring to the drawings in detail, where the same numerals indicate like elements throughout, there is shown in FIGS. 1-4 a first preferred embodiment of a tension rod generally designated 10, and hereinafter referred to as the "tension rod" 10 having a preferred embodiment of a tension rode mechanism generally designated 20 and hereinafter referred to as the "tension mechanism" 20 in accordance with the present invention.

The tension rod 10 has a first outer shaft 12 and a second inner shaft 14. The second inner shaft 14 is slideably received by the first outer shaft 12 along a longitudinal axis A of the tension rod 10, such that the tension rod 10 is adjustable in length. The first and second shafts 12, 14 are preferably made from a metal, such as cold-rolled steel, but may also be constructed using polymeric material.

Opposing ends of the first and second shafts 12, 14 may terminate in flat end faces 12a, 14a, respectively, to engage a window frame or opposing walls to support the tension rod 10 above a ground surface. Alternatively, the opposing ends of the first and second shafts 12, 14 may be fitted with semi-pliable end caps (not shown), each having a flat end face. Each of the first and second shafts 12, 14 are preferably at least partially hollow along the longitudinal axis A for receiving respective ends of the tension mechanism 20.

Figure 1B:
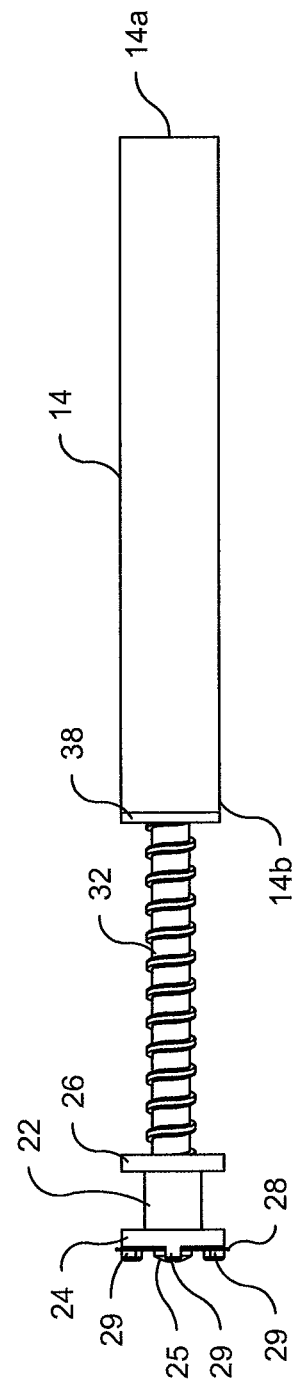
FIG. 1B is a side elevational view of a second inner shaft of a tension rod in accordance with a preferred embodiment of the present invention.
Figure 3:
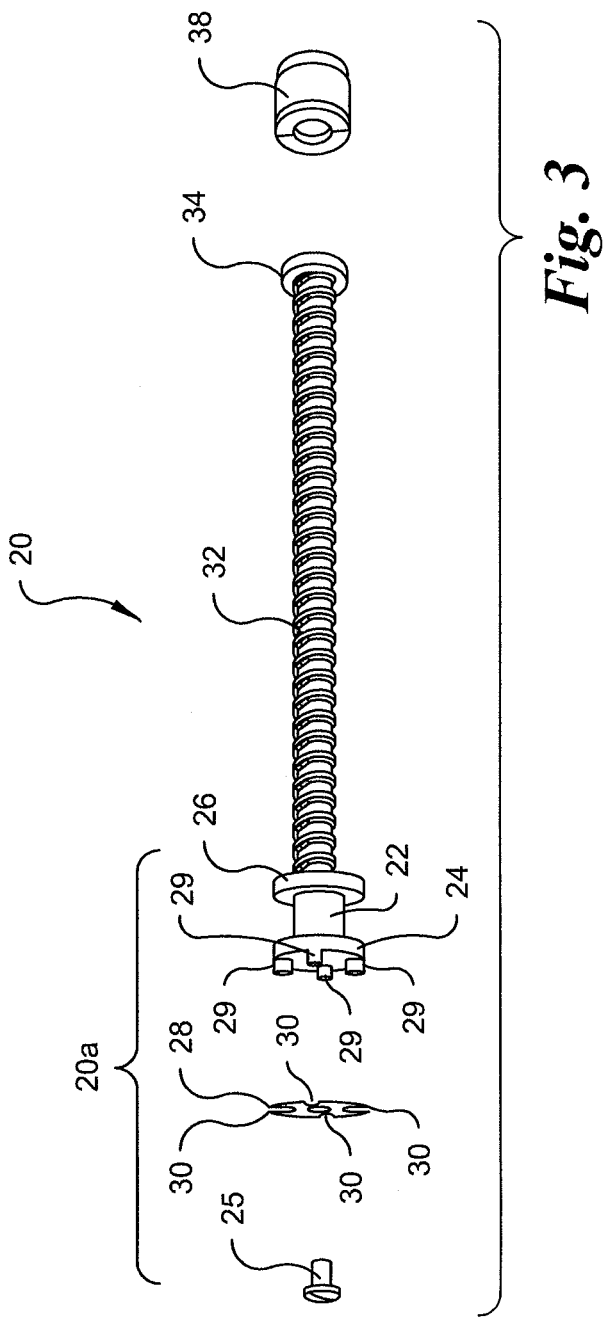
FIG. 3 is an exploded perspective view of a tension mechanism for use with the tension rod of FIG. 2.
Figure 4:
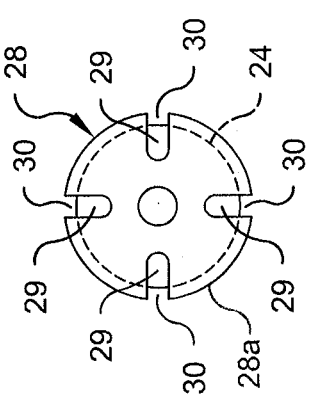
FIG. 4 is a plan view of the flexible plate of FIG. 3.

Referring to FIGS. 1B and 3, a first end of the tension mechanism 20 comprises a unidirectional slip-lock 20a configured to be received in the first outer shaft 12 for rotational movement therewith and unidirectional slidable axial movement relative thereto. In some embodiments, the unidirectional slip-lock 20a has a generally cylindrical shape and a frictional force between a circumferential edge of the unidirectional slip-lock 20a and an inner surface of the first outer shaft 12 prevents rotation of the first outer shaft 12 relative to the unidirectional slip-lock 20a and allows slidable axial movement of the unidirectional slip-lock relative to the first outer shaft 12 only in an expansion direction in which the unidirectional slip-lock moves progressively further away from the end face 12a of the outer shaft 12 when the unidirectional slip-lock is in the first outer shaft 12.

In one embodiment, the unidirectional slip-lock 20a has a first attachment shaft 22 terminated by a first end flange 24 at one end and a center flange 26 at the other end. A threaded bore 23 is provided through the first end flange 24 and at least partially into the first attachment shaft 22 along the longitudinal axis A for receiving a screw 25 or other fastening device.

The unidirectional slip-lock 20a may also have a flexible metal plate 28 that is secured to a surface of the first end flange 24 by the screw 25. In some embodiments, the flexible plate 28 has a generally circular disk like shape when the unidirectional slip-lock 20a is not in the first outer shaft 12 and a generally concave shape when the unidirectional slip-lock 20a is in the first outer shaft. A frictional force between a circumferential edge 28a of the flexible plate 28 and an inner surface of the first outer shaft 12 prevents rotation of the first outer shaft 12 relative to the flexible plate 28 and allows slidable axial movement of the flexible plate 28 relative to the first outer shaft 12 only in an expansion direction in which the unidirectional slip-lock moves progressively further away from the end face 12a of the outer shaft 12.

In the embodiment shown, the first end flange 24 includes a plurality of posts 29 received in slots 30 of the flexible metal plate 28 when assembled. A diameter of the flexible metal plate 28 is preferably slightly larger than an inner diameter of the first outer shaft 12 such that upon insertion of the tension rod mechanism 20 into the first outer shaft 12, the flexible metal plate 28, which is initially flat (see FIG. 4), takes on a concave shape (see FIG. 2) by bending about its circumference away from the tension rod mechanism 20. The concave shape allows for one-way movement of the first and second shafts 12, 14 with respect to each other. The first and second shafts 12, 14 can only move away from each other in the direction of expansion of the tension rod 10, as the flexible metal plate 28 resists relative movement of the first and second shafts in the opposite direction by maintaining its concave shape and providing friction along the inner surface of the first shaft 12. The flexible metal plate 28 is preferably made from stainless steel, but may be made from other metals having the flexibility to bend to be received in the first outer shaft 12 but the rigidity to resist bending in the opposite direction while disposed within the first outer shaft 12.

Figure 2:
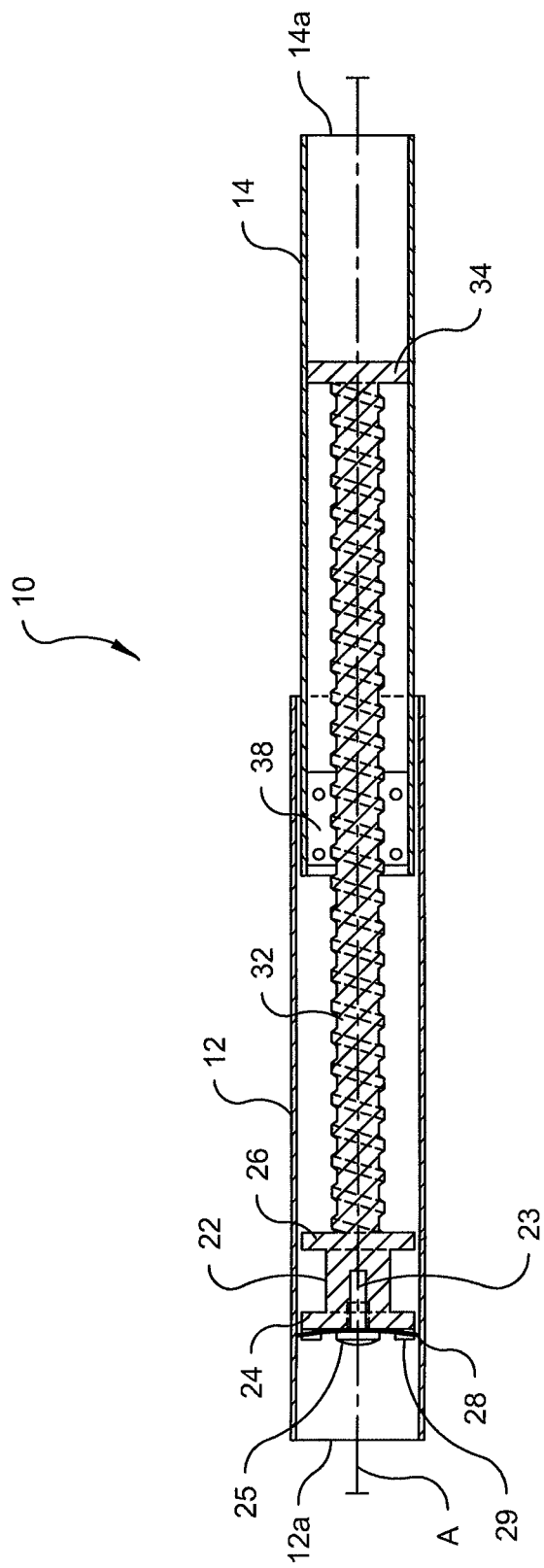
FIG. 2 is a cross-sectional view of the tension rod assembled from the first and second shafts shown in FIGS. 1A-1B.

Referring to FIG. 2, the tension mechanism 20 includes a threaded shaft 32 fixedly connected to the unidirectional slip-lock 20a. In some embodiments, the threaded shaft 32 is terminated at one end by the center flange 26 and at the other end by a second end flange 34. In such embodiments, the center flange 26 fixedly connects the threaded shaft to the unidirectional slip-lock. A diameter of the second shaft 32 is preferably constant along the longitudinal axis A. The first attachment shaft 22, threaded shaft 32, and the flanges 24, 26, 34 of the unidirectional slip-lock are preferably integrally formed as a single part molded from a polymeric material, such as polycarbonate, polystyrene, polypropylene, acrylonitrile butadiene styrene (ABS), styrene acrylonitrile (SAN), polyurethane, polyvinyl chloride (PVC), rubber, or the like. However, the first attachment shaft 22, threaded shaft 32, and flanges 24, 26, 34 may also be separate pieces assembled together and made of differing materials.

A collar 38 threadingly engages with the threaded shaft 32 for rotation and movement along the longitudinal axis A. The collar 38 is preferably made from polymeric material such as polycarbonate, polystyrene, polypropylene, ABS, SAN, polyurethane, PVC, rubber, or the like. Movement of the collar 38 along the threaded shaft 32 is limited by the center flange 26 and the second end flange 34. The end 14b of the second inner shaft 14 is fixed to the collar 38 for movement therewith. Preferably, the collar 38 is configured to be fixedly received in the second inner shaft by press (or compression) fit into the second shaft 14, and a dimple (not shown) is subsequently formed in the second shaft 14 to further lock the collar 38 in place. However, the collar 38 may also be fixed to the second shaft 14 by other methods, such as the use of adhesives, fasteners, welds, or the like. Preferably, the combined length of the unidirectional slip-lock and the second inner shaft 14 is greater than the length of the first outer shaft 12 when the collar 38 is fixedly attached to the second inner shaft 14 and in contact with the center flange 26.

In use, the tension rod 10 is assembled by inserting the flat face 14a of the second inner shaft 14 into the first outer shaft 12 proximate the flat end face 12a thereof. The second inner shaft 14 is passed through the first outer shaft 12 until the first end flange 24 and the metal plate 28 of the tension rod mechanism 20 are received within the first outer shaft 12 and the flat end face 14a of the second inner shaft 14 projects from the opposite end of the first outer shaft 12.

In a preferred initial (or starting) configuration, the combined length of the first outer shaft 12 with the second inner shaft 14 inserted therein is the shortest achievable length for the configuration and occurs when the collar 38 in contact with the center flange 26. However, the initial configuration may be a length greater than the shortest achievable length by positioning the collar at any location along the threaded shaft 32. When the unidirectional slip-lock 20a is in the first outer shaft 12 and the collar 38 is fixedly received in the second inner shaft 14, slidable axial movement of the unidirectional slip-lock relative to the first outer shaft may occur only in an expansion direction. A rotation of the first outer shaft 12 relative to the second inner shaft 14 increases the axial distance between the unidirectional slip-lock 20a and the collar 38

A user adjusts the length of the tension rod 10 by sliding the first and second shafts 12, 14 away from one another along the longitudinal axis A. The deformation of the flexible metal plate 28 allows the expansion of the tension rod 10 but prevents contraction thereof by opposing motion pressing the first and second shafts 12, 14 toward one another. Thus, the flexible metal plate 28 provides a friction along the inner surface of the first shaft 12 that "locks" and prevents further sliding motion between the first and second shafts 12, 14.

Once the tension rod 10 is level between two support surfaces (not shown) and the flat end faces 12a, 14a are in contact with the support surfaces, the second inner shaft 14 is rotated with respect to the first outer shaft 12. The relative rotation moves the collar 38 along the threaded shaft 32 from the center flange 26 toward the second end flange 34 increasing the axial distance between the central and second end flanges 26, 34 and therefore the overall length of the tension rod 10. If the flat end faces 12a, 14a of the tension rod 10 are in contact with opposed support surfaces preventing further extension of the tension rod 10, the rotation increases the axial loading of the rod and hence the tension in the rod 10.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

I claim:

1. A tension rod mechanism for a tension rod having a first outer shaft and a second inner shaft slideably received by the first outer shaft and rotatable about a longitudinal axis of the tension rod, the tension rod mechanism comprising:

a unidirectional slip-lock configured to be received in the first outer shaft for rotational movement therewith and unidirectional slidable axial movement relative thereto, the unidirectional slip-lock having a first attachment shaft terminated by a first end flange at one end and a center flange at another end spaced from the one end;

a threaded shaft fixedly connected to the unidirectional slip-lock by the center flange; and a collar threadingly engaged with the threaded shaft and configured to be fixedly received in the second inner shaft for movement therewith, wherein, when the unidirectional slip-lock is in the first outer shaft and the collar is fixedly received in the second inner shaft, slidable axial movement of the unidirectional slip-lock relative to the first outer shaft may occur only in an expansion direction and a rotation of the first outer shaft relative to the second inner shaft increases the axial distance between the unidirectional slip-lock and the collar.

2. The tension rod mechanism according to claim 1, wherein the unidirectional slip-lock has a generally cylindrical shape and a frictional force between a circumferential edge of the unidirectional slip-lock and an inner surface of the first outer shaft prevents rotation of the first outer shaft relative to the unidirectional slip-lock and allows slidable axial movement of the unidirectional slip-lock relative to the first outer shaft only in an expansion direction when the unidirectional slip-lock is in the first outer shaft.

3. The tension rod mechanism according to claim 1, wherein the unidirectional slip-lock has a flexible plate having a generally concave shape when the unidirectional slip-lock is in the first outer shaft and a frictional force between a circumferential edge of the flexible plate and an inner surface of the first outer shaft prevents rotation of the first outer shaft relative to the flexible plate and allows slidable axial movement of the flexible plate relative to the first outer shaft only in an expansion direction.

4. The tension rod mechanism according to claim 1, wherein the unidirectional slip-lock has a flexible plate having a plate diameter greater than an inner diameter of the first outer shaft.

5. The tension rod mechanism according to claim 1, wherein the threaded shaft and the unidirectional slip-lock are integrally formed as a single part.

6. The tension rod mechanism according to claim 1, wherein the collar is fixedly attached to the second inner shaft by a compression fit.

7. The tension rod mechanism according to claim 1, wherein the threaded shaft is terminated at one end by a center flange and at another end by a second end flange.

8. A tension rod comprising:
a first outer shaft; and
a second inner shaft slideably received by the first outer shaft,
wherein the first outer shaft and the second inner shaft are operatively coupled by the tension rod mechanism of claim 1.

* * * * *